(12) United States Patent
Rathod et al.

(10) Patent No.: US 12,252,109 B2
(45) Date of Patent: Mar. 18, 2025

(54) BLENDED CHARGE DEPLETION AND NAVIGATION-BASED CHARGE ALLOCATION FOR RANGE-EXTENDED ELECTRIFIED VEHICLES

(71) Applicant: FCA US LLC, Auburn Hills, MI (US)

(72) Inventors: Dhruvang Rathod, Troy, MI (US); Andy M Lee, Troy, MI (US); Barry A Mason, Bradford (CA); Cristian Rostiti, Pontiac, MI (US)

(73) Assignee: FCA US LLC, Auburn Hills, MI (US)

( * ) Notice: Subject to any disclaimer, the term of this patent is extended or adjusted under 35 U.S.C. 154(b) by 194 days.

(21) Appl. No.: 17/953,703

(22) Filed: Sep. 27, 2022

(65) Prior Publication Data

US 2024/0101100 A1 Mar. 28, 2024

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B60W 20/12* (2016.01); *B60W 2510/244* (2013.01); *B60W 2530/10* (2013.01); *B60W 2530/16* (2013.01); *B60W 2552/05* (2020.02); *B60W 2552/15* (2020.02); *B60W 2554/00* (2020.02);
(Continued)

(58) Field of Classification Search
CPC ...... B60W 20/13; B60W 10/06; B60W 10/08; B60W 20/12; B60W 2510/244; B60W 2530/10; B60W 2530/16; B60W 2552/05; B60W 2552/15; B60W 2554/00; B60W 2555/20; B60W 2555/60; B60W 2710/0666; B60W 2710/244

See application file for complete search history.

(56) References Cited

U.S. PATENT DOCUMENTS 8,972,090 B2 3/2015 Weslati et al.
9,242,653 B2 1/2016 Schweikl et al.
(Continued)

OTHER PUBLICATIONS

Larsson, V., et al, "Impact of trip length uncertainty on optimal discharging strategies for PHEVs". 6th IFAC Symposium Advances in Automotive Control, Munich, Germany, pp. 55-60, (Jul. 12-14, 2010).

*Primary Examiner* — Brian P Sweeney
(74) *Attorney, Agent, or Firm* — Jeremy J. Klobucar

(57) ABSTRACT

Intelligent battery depletion techniques for a range-extended electrified vehicle (REEV) include receiving at least (i) a state of charge (SOC) of a battery system of the REEV and (ii) a distance for a trip of the REEV, controlling an electrified powertrain (engine and electric motor) of the REEV to generate a drive torque to satisfy a driver torque request, based on at least the battery system SOC and the trip distance, determining, an optimized charge depletion or allocation profile for the trip for powering the electric motor/battery system, and controlling the electrified powertrain based on the blended charge depletion or allocation profile until the trip distance has been reached or the battery system SOC reaches a desired minimum level, and then transitioning to a charge sustaining mode where the engine generates the drive torque and maintains the battery system SOC at the desired minimum level.

18 Claims, 11 Drawing Sheets

(51) Int. Cl.
  *B60W 10/08* (2006.01)
  *B60W 20/12* (2016.01)
(52) U.S. Cl.
  CPC ..... *B60W 2555/20* (2020.02); *B60W 2555/60* (2020.02); *B60W 2710/0666* (2013.01); *B60W 2710/244* (2013.01)

(56) References Cited

U.S. PATENT DOCUMENTS

| | | |
|---|---|---|
| 10,065,525 B2 | 9/2018 | Chen et al. |
| 10,882,411 B2 | 1/2021 | Yang et al. |
| 2005/0052080 A1 | 3/2005 | Maslov et al. |
| 2010/0076878 A1 | 3/2010 | Burr et al. |
| 2011/0166732 A1* | 7/2011 | Yu ........................ B60W 10/04 |
| | | 180/65.265 |
| 2012/0035795 A1* | 2/2012 | Yu ........................ B60W 20/12 |
| | | 180/65.265 |
| 2016/0167641 A1* | 6/2016 | Yoon ................. G08G 1/09623 |
| | | 903/903 |

* cited by examiner

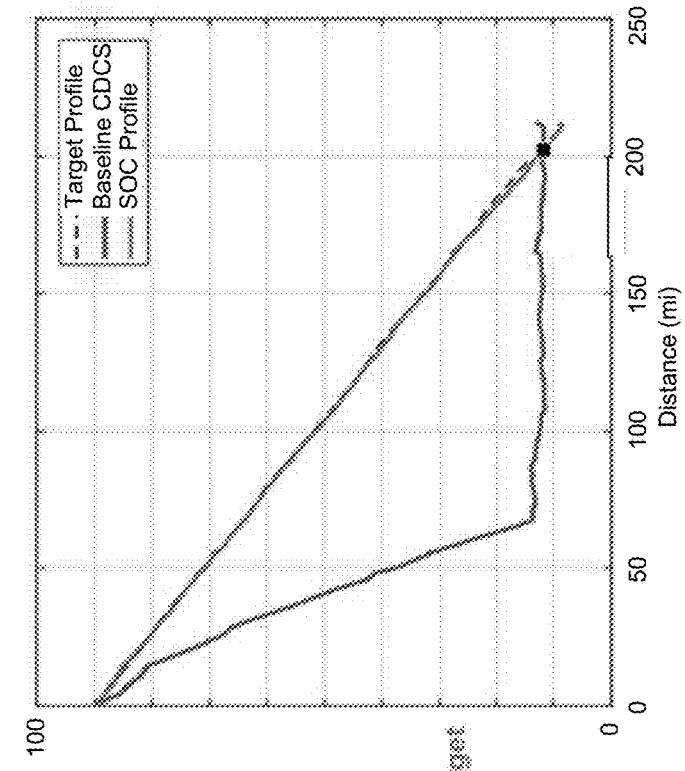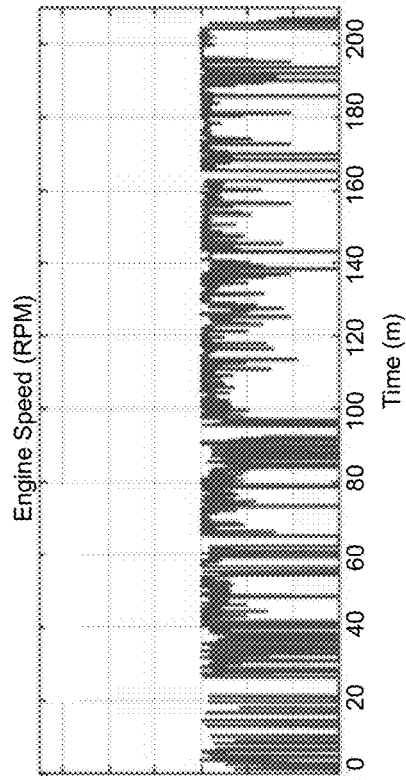
FIGS. 1C-1D
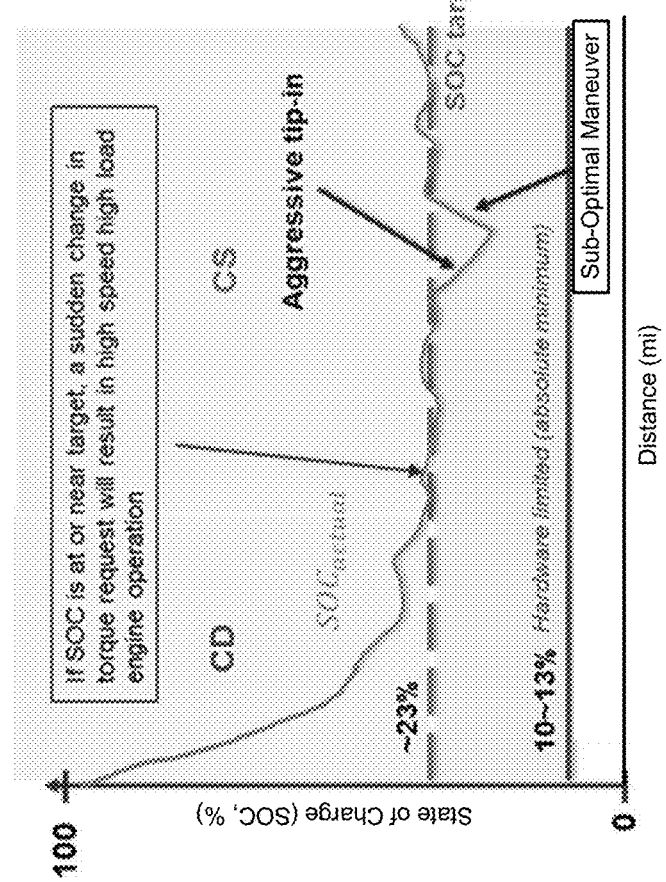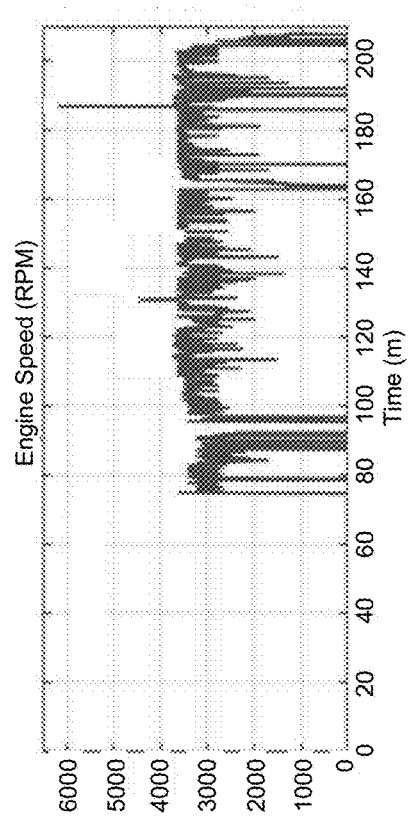
FIGS. 1A-1B

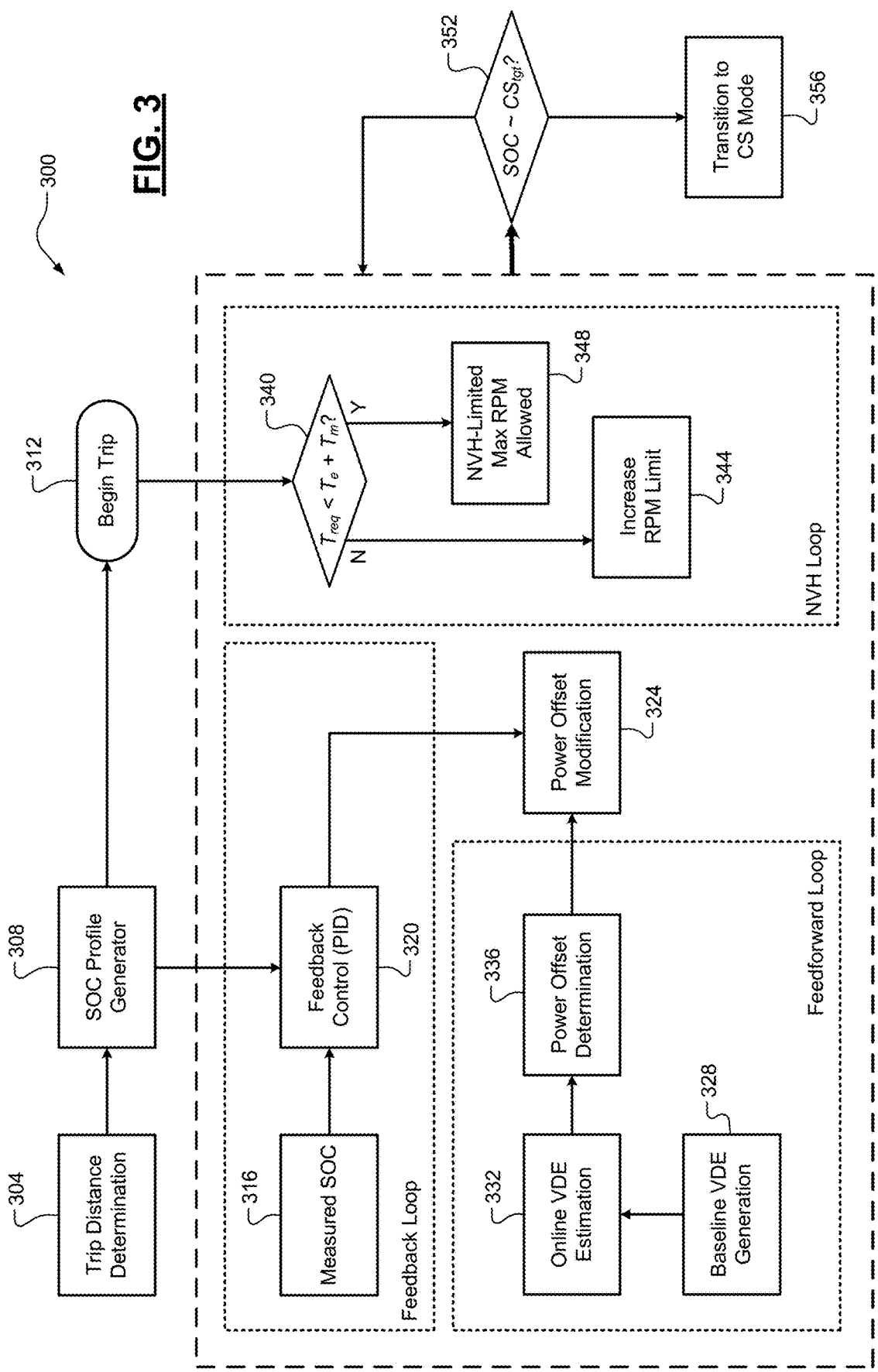

BLENDED CHARGE DEPLETION AND NAVIGATION-BASED CHARGE ALLOCATION FOR RANGE-EXTENDED ELECTRIFIED VEHICLES

FIELD

The present application generally relates to range-extended electrified vehicles (REEVs) and, more particularly, to blended state of charge (SOC) depletion and/or navigation-based SOC allocation for REEVs.

BACKGROUND

Range is discussed as one of the major issues in preventing certain consumers from considering/purchasing electrified vehicles (EVs). Range-extended EVs (REEVs) aim to achieve extended range, but the consumer preconceptions still exist. Overcoming this preconception is particularly important, for example, for an REEV configured pickup truck with towing capability. Conventional REEVs deplete their battery charge first to minimize instantaneous fuel consumption, followed by maintaining a target level of battery state of charge (SOC). This control strategy is also known as "charge depletion, charge sustaining." For long-distance and towing scenarios, this is noticeable to the driver (i.e., a quickly depleting EV range value), including the subsequent shift to using the engine for power/recharging, which will be audibly noticeable and tend to operate at a higher speed than a conventional vehicle giving the perception of reduced capability. Accordingly, while such conventional REEVs do work for their intended purpose, there exists an opportunity for improvement in the relevant art.

SUMMARY

According to one example aspect of the invention, an intelligent battery depletion system for a range-extended electrified vehicle (REEV) is presented. In one exemplary implementation, the intelligent battery depletion system comprises a set of devices configured to monitor at least (i) a state of charge (SOC) of a battery system of the REEV and (ii) a distance for a trip of the REEV and a controller configured to control an electrified powertrain of the REEV to generate a drive torque to satisfy a driver torque request, wherein the electrified powertrain comprises an engine and an electric motor powered by the battery system, based on at least the battery system SOC and the trip distance, determine an optimized charge depletion or allocation profile for the trip for powering the electric motor by the battery system, and control the electrified powertrain based on the optimized charge depletion or allocation profile until the trip distance has been reached or the battery system SOC reaches a desired minimum level, and then transitioning to a charge sustaining mode where the engine generates the drive torque and maintains the battery system SOC at the desired minimum level.

In some implementations, the controller is configured to, based on the battery system SOC, the trip distance, and navigation information, determine a navigation-based SOC allocation profile for powering the electric motor by the battery system based on the battery system SOC and the trip distance, and control the electrified powertrain based on the blended charge depletion profile until the trip distance has been reached. In some implementations, the set of devices includes a navigation system configured to monitor the navigation information including at least a destination for the trip, a route of travel to the trip destination, and road characteristics along the travel route. In some implementations, the road characteristics along the travel route include at least some of road type, road surface type, road grade, road speed limits, road EV zone type, weather conditions, and traffic conditions.

In some implementations, the controller is configured to determine a blended charge depletion profile for powering the electric motor by the battery system based on the battery system SOC and the trip distance, wherein the blended charge depletion profile includes utilizing the engine to produce at least a portion of the drive torque and wherein the blended charge depletion profile is more gradual than a full or maximum depletion rate of the battery system to the electric motor, and control the electrified powertrain based on the blended charge depletion profile until the trip distance has been reached or the battery system SOC reaches a desired minimum level. In some implementations, the controller is further configured to determine a vehicle demand energy (VDE) metric as a lumped term based on rolling resistance, aerodynamic drag, road grade, and a trailer payload being towed by the REEV, wherein the VDE metric represents a ratio of the REEV energy consumption compared to a baseline energy consumption of the REEV, and determine a feedforward power offset based on the VDE metric, wherein the feedforward power offset is used to determine the blended charge depletion profile such that a larger power offset causes a more gradual or lesser rate of charge depletion and vice-versa.

In some implementations, the set of devices further comprises a driver interface configured to receive driver input from a driver of the REEV and output information to the driver, and the driver input includes at least the driver torque request and a selectable mode comprising one of normal, long trip, tow, and a tow plus electric. In some implementations, the driver input further includes a value for the trip distance when the long trip mode or tow mode is selected and the trip distance is otherwise determined by the navigation system, and the desired minimum level for the battery system SOC for defining the blended charge depletion profile is increased when the tow mode or the tow plus electric mode is selected. In some implementations, the controller is configured to determine the blended charge depletion profile subject to noise/vibration/harshness (NVH) constraints relating to operating speeds of the engine, wherein the NVH constraints define a maximum operating speed of the engine. In some implementations, the blended charge depletion profile is a linear charge depletion profile over the estimated trip distance.

According to another example aspect of the invention, an intelligent battery depletion method for an REEV is presented. In one exemplary implementation, the intelligent battery depletion method comprises receiving, by a controller of the REEV and from a set of devices of the REEV, at least (i) an SOC of a battery system of the REEV and (ii) a distance for a trip of the REEV, controlling, by the controller, an electrified powertrain of the REEV to generate a drive torque to satisfy a driver torque request, wherein the electrified powertrain comprises an engine and an electric motor powered by the battery system, based on at least the battery system SOC and the trip distance, determining, by the controller, an optimized charge depletion or allocation profile for the trip for powering the electric motor by the battery system, and controlling, by the controller, the electrified powertrain based on the blended charge depletion or allocation profile until the trip distance has been reached or the battery system SOC reaches a desired minimum level, and then transitioning to a charge sustaining mode where the engine generates the drive torque and maintains the battery system SOC at the desired minimum level.

In some implementations, the controller is configured to, based on the battery system SOC, the trip distance, and navigation information, determine a navigation-based SOC allocation profile for powering the electric motor by the battery system based on the battery system SOC and the trip distance, and control the electrified powertrain based on the blended charge depletion profile until the trip distance has been reached. In some implementations, the set of devices includes a navigation system configured to monitor the navigation information including at least a destination for the trip, a route of travel to the trip destination, and road characteristics along the travel route. In some implementations, the road characteristics along the travel route include at least some of road type, road surface type, road grade, road speed limits, road EV zone type, weather conditions, and traffic conditions.

In some implementations, the controller is further configured to determine a blended charge depletion profile for powering the electric motor by the battery system based on the battery system SOC and the trip distance, wherein the blended charge depletion profile includes utilizing the engine to produce at least a portion of the drive torque and wherein the blended charge depletion profile is more gradual than a full or maximum depletion rate of the battery system to the electric motor, and control the electrified powertrain based on the blended charge depletion profile until the trip distance has been reached or the battery system SOC reaches a desired minimum level. In some implementations, the method further comprises determining, by the controller, a VDE metric as a lumped term based on rolling resistance, aerodynamic drag, road grade, and a trailer payload being towed by the REEV, wherein the VDE metric represents a ratio of the REEV energy consumption compared to a baseline energy consumption of the REEV, and determining, by the controller, a feedforward power offset based on the VDE metric, wherein the feedforward power offset is used to determine the blended charge depletion profile such that a larger power offset causes a more gradual or lesser rate of charge depletion and vice-versa.

In some implementations, the set of devices further comprises a driver interface configured to receive driver input from a driver of the REEV and output information to the driver, and the driver input includes at least the driver torque request and a selectable mode comprising one of normal, long trip, tow, and a tow plus electric. In some implementations, the driver input further includes a value for the trip distance when the long trip mode or tow mode is selected and the trip distance is otherwise determined by the navigation system, and the desired minimum level for the battery system SOC for defining the blended charge depletion profile is increased when the tow mode or the tow plus electric mode is selected. In some implementations, determining, by the controller, the blended charge depletion is subject to NVH constraints relating to operating speeds of the engine, wherein the NVH constraints define a maximum operating speed of the engine. In some implementations, the blended charge depletion profile is a linear charge depletion profile over the estimated trip distance.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 1A-1D are example plots of conventional charge depletion, charge sustaining (CDCS) battery depletion, and improved blended charge depletion (BCD) according to the principles of the present application;

FIG. 3 is a functional block diagram of an example control architecture for the intelligent battery charge depletion system of FIG. 2 for blended charge depletion (BCD) mode according to the principles of the present application;

DESCRIPTION

Figure 2:
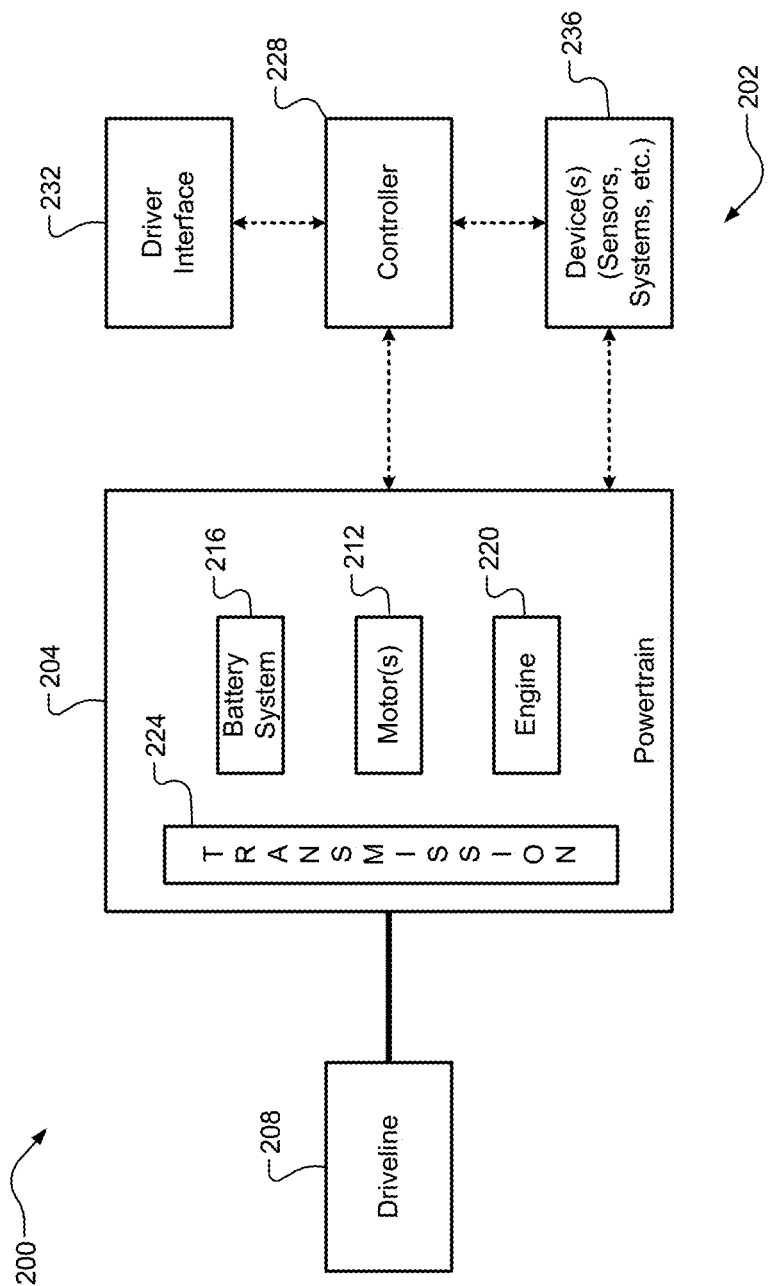
FIG. 2 is a functional block diagram of a range-extended electrified vehicle (REEV) having an intelligent battery charge depletion or allocation system according to the principles of the present application.

As previously discussed, conventional range-extended electrified vehicles (REEVs) typically operate in a "charge depletion, charge sustaining" (CDCS) mode where battery charge is depleted first to minimize instantaneous fuel consumption, followed by maintaining a target level of battery state of charge (SOC). For long-distance and towing scenarios, this is noticeable to the driver (i.e., a quickly depleting EV range value), including the subsequent shift to using the engine for power/recharging, which will be audibly noticeable and tend to operate at a higher speed than a conventional vehicle giving the perception of reduced capability. Accordingly, systems and methods for providing improved intelligent range-extension modes for REEVs is presented herein.

In one aspect, a smart "blended charge depletion" (BCD) mode takes into account a variety of factors in determining how battery charge is depleted during a vehicle trip. In other words, during the BCD mode, both the engine and the battery are utilized to slowly deplete the battery SOC over an extended trip. This is achieved through subjective cost calibrations and noise/vibration/harshness (NVH) limits. A metric called vehicle demand energy (VDE) is calculated based on parameters such as rolling resistance, aerodynamic drag, road grade, and trailer payload/mass. The selection of a tow mode by the driver can also be taken into account.

In one embodiment, the BCD mode reaches the target battery SOC (e.g., ~23%) at the end of the trip (e.g., distance-based, such as via a driver input). In another aspect, a smart navigation-based SOC allocation mode takes into account navigation information (speed limits, road grades, traffic conditions, etc.) to even more intelligently plan out the charge depletion to the target battery SOC by the end of the trip.

In contrast to the above-described BCD mode, this navigation-based SOC allocation mode does not require a driver distance selection nor the above-described VDE metrics. Instead, the upcoming/current trip is divided into segments, defines a specific cost function, then computes an optimal SOC variation in each segment based on a dynamic programming technique or algorithm. This navigation-based SOC allocation mode can satisfy specific constraints that the BCD mode cannot, such as increased SOC to support engine operation in high torque demand segments (e.g., up large, long grades, such as mountains) and satisfying EV range in specific EV (LEZ) zones. Potential benefits for both of these aspects include an improved driver experience and addressing the negative range-related consumer preconceptions for REEVs, particularly for REEVs configured as a pickup truck with rated and expected towing capabilities.

Referring now to FIGS. 1A-1D, example plots of conventional charge depletion, charge sustaining (CDCS) battery depletion and improved blended charge depletion according to the principles of the present application are illustrated. FIGS. 1A (upper left) and 1B (lower left) illustrate CDCS charge depletion and some of its drawbacks. As shown in FIGS. 1A-1B, CDCS includes a charge depletion (CD) period (e.g., motor-only) followed by a charge sustaining (CS) period (e.g., engine plus motor). The SOC target value (e.g., ~23%) is utilized to not over-discharge the battery system, such as in an effort to extend its age/health and to reserve charge for certain maneuvers. There is also a hardware limited minimum SOC value (e.g., 10-13%) that is set for the same reasons above (e.g., to not damage the battery system). As shown, during the CS period where the battery system SOC is hovering around the SOC target, a sudden change in torque request (e.g., an aggressive tip-in) could result in high speed, high load engine operation, which is a sub-optimal maneuver as shown. For example, the vehicle could appear as if its struggling, which could be undesirable to a driver.

In contrast to the conventional CDCS techniques described above and shown in FIGS. 1A-1B, FIGS. 1C-1D illustrated an improved BCD mode. FIG. 1C (upper right) illustrates the battery system SOC over a vehicle trip of approximately 200 miles (mi), where the SOC follows a target profile for the BCD mode as opposed to the conventional CDCS mode. In one exemplary implementation, this target SOC profile can be linear and calculated based on vehicle operating conditions/parameters and a final distance (e.g., provided by the driver or a navigation system). In other words, this SOC profile for BCD mode is more gradual than a full or maximum depletion rate of the battery system 216 to the electric motor(s) 212. It will be appreciated that a non-linear SOC target profile could also be utilized, which will be discussed in greater detail below. As shown, a sub-optimal (e.g., aggressive tip-in) maneuver does not cause the engine speed/load spike and battery system SOC drop below the target SOC because the engine and the battery are both providing the power to move the vehicle throughout the trip distance as a result of the BCM mode and its target SOC profile.

Referring now to FIG. 2, a functional block diagram of an example REEV 200 having an intelligent battery charge depletion or allocation system 202 according to the principles of the present application is illustrated. While a REEV-configured electrified vehicle is specifically shown and described herein, it will be appreciated that the techniques of the present disclosure. The REEV 200 (also referred to herein as "vehicle 200") generally comprises an electrified powertrain 204 configured to generate and transfer drive torque to a driveline 208 for vehicle propulsion. The powertrain 204 comprises one or more electric motors 212 powered by a battery system 216 and configured to generate the drive torque (torque generator) and/or generate electrical energy (torque consumer) to recharge the battery system 216. The powertrain 204 also comprises an internal combustion engine 220 configured to combust a mixture of fuel (e.g., gasoline) and air to generate drive torque.

The drive torque collectively generated by the electric motor(s) 212 and the engine 220 is transferred to the driveline 208 via a transmission 224. A controller 228 controls operation of the REEV 200, including controlling the powertrain 204 to generate a desired amount of drive torque based on a driver torque request received via a driver interface 232 (e.g., an accelerator pedal). The controller 228 also receives inputs from a set of devices 236 (sensors, other systems, etc.) that are used in performing powertrain torque control.

Non-limiting examples of the devices 236 include vehicle/engine speed sensors, a battery system SOC sensor, a navigation system (e.g., including a global navigation satellite system, or GNSS transceiver), a trailer payload sensor, and a vehicle mode sensor (normal, long trip, tow/haul, tow/haul+electric, etc.). Based on at least the battery system SOC and the trip distance, the controller 228 is configured to determine a BCD profile or a navigation-based optimized SOC allocation profile (hereinafter, "navigation-based SOC allocation") for powering the electric motor(s) 212 by the battery system 216 in conjunction with operating the engine 220. The controller 228 is configured to then control the electrified powertrain 204 based on the BCD profile or navigation-based SOC allocation until the trip distance has been reached, after which the controller 228 could transition to a CS or similar mode where the engine 220 generates the drive torque and maintains the battery system SOC at a desired minimum level.

Inputs provided by the navigation system include, for example only, at least a destination for the trip, a route of travel to the trip destination, and road characteristics along the travel route. The road characteristics along the travel route include, for example only, at least some of road type (e.g., EV-only, or LEZ zones), road surface type (major paved road, rural paved road, unpaved road, etc.), road grade (include/decline), road speed limits, weather conditions, and traffic conditions. The trailer payload being towed by the REEV 200 could also be taken into account.

Referring now to FIG. 3, a functional block diagram of an example control architecture 300 for the intelligent battery charge depletion system 202 of FIG. 2 (BCD mode) according to the principles of the present application is illustrated. It will be appreciated that this control architecture 300 is merely one example architecture and that similar or other suitable architectures for achieving the same goals/outputs could be utilized. At block 304, the trip distance is determined (via a driver input, by the navigation system, etc.). At block 308, an SOC profile for BCD mode is determined. This SOC profile could be linear as previously shown and described or could be non-linear and changing throughout the vehicle trip, which starts at 312. In a feedback loop, the measured SOC of the battery system 216 is obtained and used along with the SOC profile to generate a feedback control term (e.g., proportional-integral-derivative, or PID) at block 320 that is provided to a power offset modification block 324. In a feedforward loop, a power offset determination value is determined and provided to block 324 for power offset modification as discussed above. This feedforward loop takes into account the previously-mentioned VDE metric and vehicle modes.

Figure 4A:
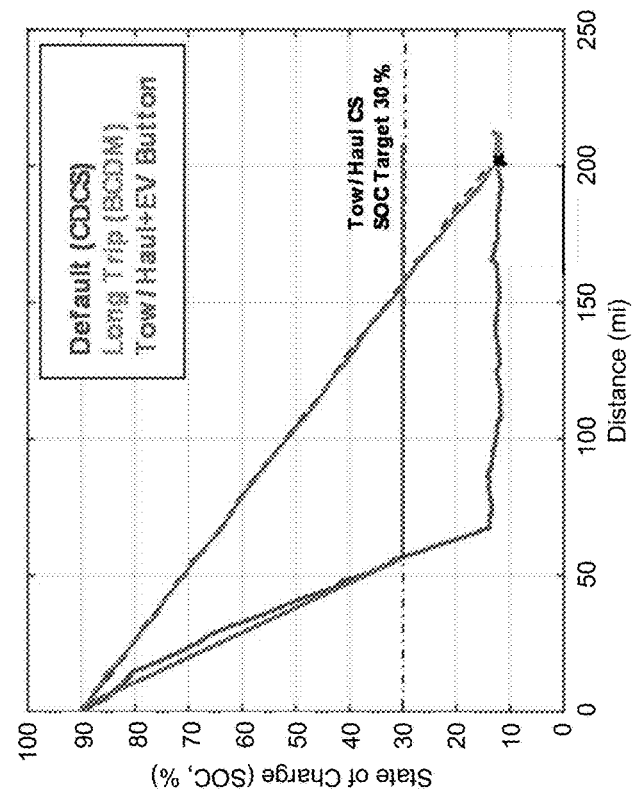
FIGS. 4A-4C are example plots of varying vehicle demand energy (VDE), based on different trailer payload examples, and the resulting state of charge (SOC) profiles that could be achieved for different strategies, according to the principles of the present application.
Figure 4B:
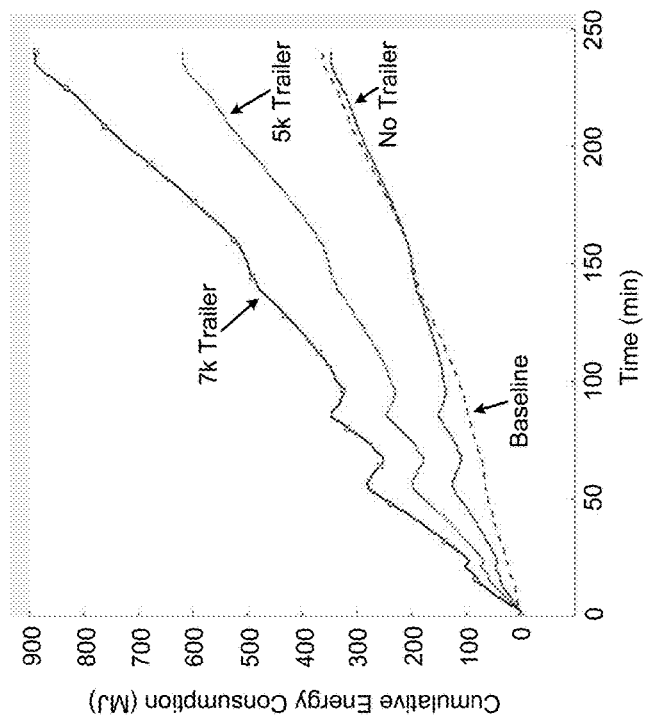
Figure 4C:
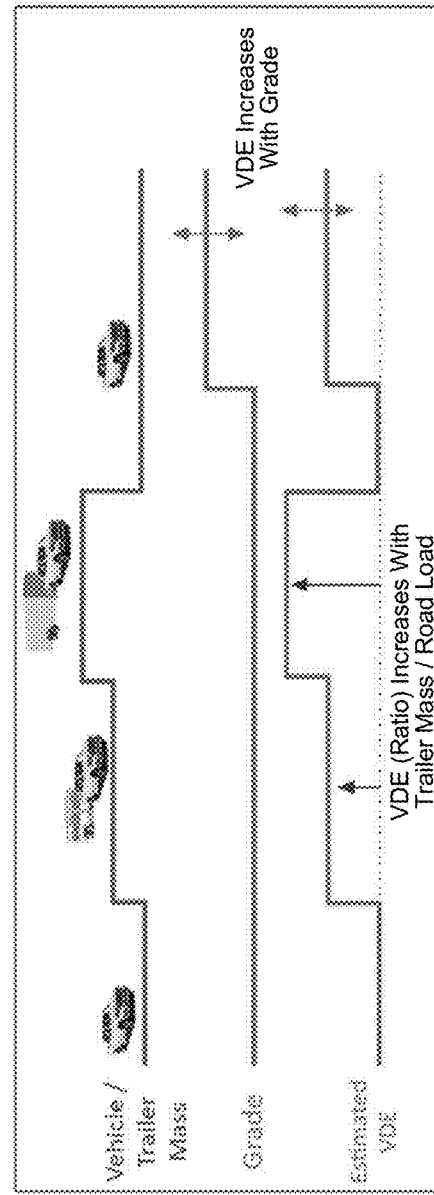

Referring now to FIGS. 4A-4C and with continued reference to FIG. 3, various plots of the BCD mode at baseline and loaded (i.e., various trailer payloads) operation conditions and various vehicle "modes" (e.g., towing modes) according to the principles of the present application are illustrated. In the feedforward loop, the baseline VDE is generated at block 328. This could be, for example, a predetermined value or a value learned over time that represents the VDE of the REEV 200 without any substantial load changes/modifications. FIGS. 4A-4C illustrated varying VDE metrics in response to various trailer payloads, road grades, and vehicle modes.

FIG. 4A, for example, illustrates the cumulative energy consumption of the REEV 200 (in mega joules, or MJ) for varying different payloads. In some implementations, the driver interface 232 is configured to receive driver input indicating a selectable mode (e.g., via a knob or wheel) comprising one of normal, long trip, tow/haul, and a tow/haul plus electric or "EV." The driver input could also include the estimated trip distance, which could otherwise be determined by the navigation system. As shown in FIG. 4B, the desired minimum level for the battery system SOC for defining the BCD profile is increased (e.g., ~30%) when the tow/haul or tow/haul plus EV mode is selected.

At block 332, the online estimation of the VDE metric is performed, such as based on trailer payload/vehicle mode as discussed above. In one exemplary implementation, the VDE metric is estimated as a lumped term based on rolling resistance, aerodynamic drag, road grade, and the trailer payload. The VDE metric represents a ratio of the current vehicle VDE to the baseline vehicle VDE (e.g., see FIG. 4C). At block 336, a feedforward power offset is determined based on the VDE metric, wherein the feedforward power offset is used to adjust the actual SOC profile (relative to the target BCD profile) such that a larger power offset causes a more gradual or lesser rate of charge depletion and vice-versa.

During the trip, and NVH loop is also executing, which attempts to apply NVH constraints to the operation of the engine 220. At 340, it is determined whether the torque request ($T_{req}$) is less than a sum of the engine torque ($T_e$) and the motor(s) torque ($T_m$). When true, the NVH-limited maximum RPM of the engine 220 is allowed. Otherwise (when false), the RPM limit of the engine 220 is increased (e.g., beyond the NVH-based limit). This process (the various loops) continues to run while the battery system SOC is monitored until it approaches or decreases to a CS target level ($CS_{tgt}$). When this finally occurs, operation fully switches to CS mode as there is insufficient battery system SOC to continue the BCD mode operation.

Figure 5:
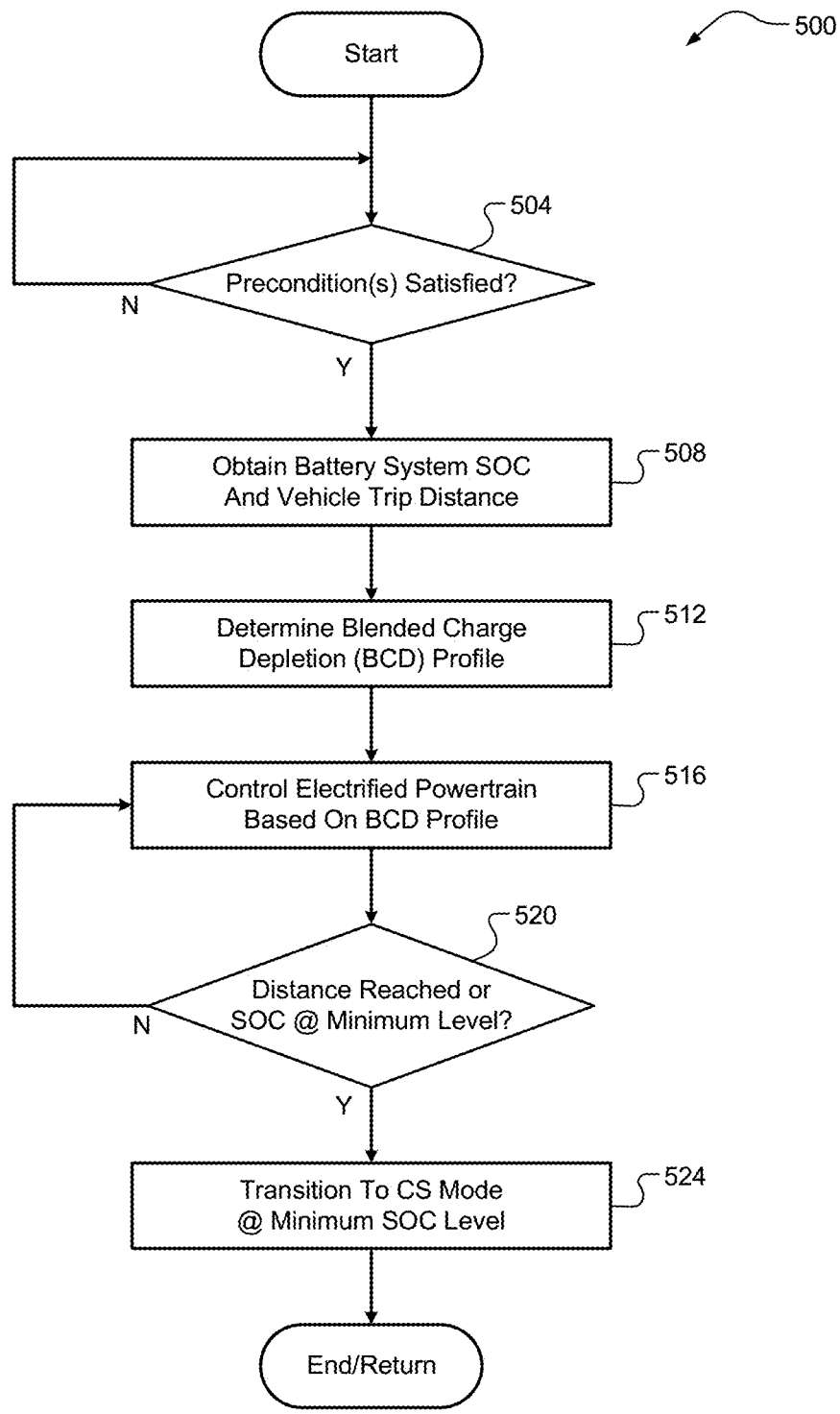
FIG. 5 is a flow diagram of an example intelligent battery charge depletion method, or BCD mode, for an REEV according to the principles of the present application.

Referring now to FIG. 5, a flow diagram of an example intelligent battery charge depletion method 500 (BCD mode) for an REEV according to the principles of the present application is illustrated. While the REEV 200 and its components are specifically referenced for illustrative purposes, it will be appreciated that the method 500 could be applicable to any suitable electrified vehicle having both an engine and one or more electric motors powered by a battery system. At 504, the controller 228 determines whether a set of preconditions are satisfied. This could include, for example, both the engine 220 and electric motor(s) 212 being in working order, the battery system 216 having a threshold SOC, and an absence of any faults or malfunctions. When true, the method 500 proceeds to 508. Otherwise, the method 500 ends or returns to 504. At 508, the controller 228 receives or obtains, from the set of devices 236, at least (i) an SOC of the battery system 216 and (ii) a distance for a trip of the REEV 200.

At 512, the controller 228 determines a BCD profile for powering the electric motor(s) 212 by the battery system 216 based on the battery system SOC and the trip distance, wherein the BCD profile includes utilizing the engine 220 to produce at least a portion of the drive torque. As previously discussed herein, this BCD profile could be determined by the controller 228 based on, among other factors, (i) the VDE metric (e.g., aa lumped term based on rolling resistance, aerodynamic drag, road grade, and the trailer payload) representing a ratio of the REEV energy consumption compared to a baseline energy consumption of the REEV 200 and (ii) a feedforward power offset based on the VDE metric. At 516, the controller 228 controls the electrified powertrain 204 based on the BCD profile.

At 520, the controller 228 determines whether the trip distance has been reached or the battery system SOC reaches a desired minimum level. When true, the method 500 proceeds to 524. Otherwise, the method 500 returns to 516. At 524, the controller 228 transitions controlling of the electrified powertrain 204 to a charge sustaining (CS) mode where the engine generates the drive torque and maintains the battery system SOC at the desired minimum level and the method 500 then ends or returns to 504 for one or more additional cycles.

As generally herein thus far, in another aspect of the present application, a smart navigation-based SOC allocation mode takes into account navigation information (speed limits, road grades, traffic conditions, etc.) to even more intelligently plan out the charge depletion to the target battery SOC by the end of the trip. In contrast to the above-described BCD mode, this navigation-based SOC allocation mode does not require a driver distance selection nor the above-described VDE metrics. Instead, the upcoming/current trip is divided into segments, defines a specific cost function, then computes an optimal SOC variation in each segment based on a dynamic programming technique or algorithm.

This navigation-based SOC allocation mode can satisfy specific constraints that the BCD mode cannot, such as increased SOC to support engine operation in high torque demand segments (e.g., up large, long grades, such as mountains) and satisfying EV range in specific EV (LEZ) zones. Potential benefits for both of these aspects include an improved driver experience and addressing the negative range-related consumer preconceptions for REEVs, particularly for REEVs configured as a pickup truck with rated and expected towing capabilities.

Figure 6:
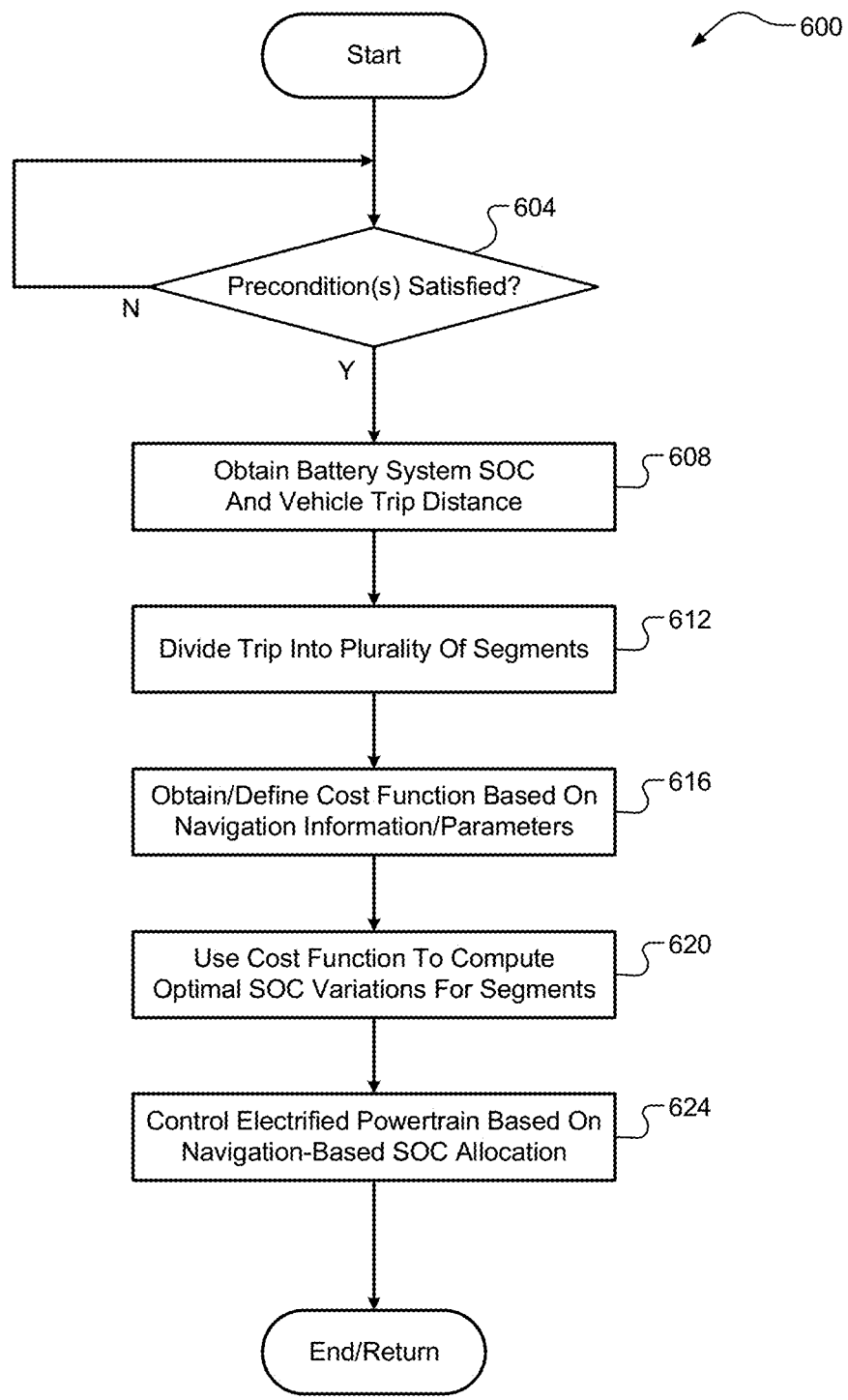
FIG. 6 is a flow diagram of an example intelligent battery charge allocation method, or navigation-based SOC allocation mode, for an REEV according to the principles of the present application.

Referring now to FIG. 6, a flow diagram of another intelligent battery charge allocation method 600 (the navigation-based SOC allocation mode) for an REEV according to the principles of the present application is illustrated. While the REEV 200 and its components are specifically referenced for illustrative purposes, it will be appreciated that the method 600 could be applicable to any suitable electrified vehicle having both an engine and one or more electric motors powered by a battery system.

At 604, the controller 228 determines whether a set of preconditions are satisfied. This could include, for example, both the engine 220 and electric motor(s) 212 being in working order, the battery system 216 having a threshold SOC, and an absence of any faults or malfunctions. When true, the method 600 proceeds to 608. Otherwise, the method 600 ends or returns to 604. At 608, the controller 228 receives or obtains, from the set of devices 236, at least (i) an SOC of the battery system 216 and (ii) a distance for a trip of the REEV 200. At 612, the controller 228 divides the upcoming/current trip into a plurality of segments.

These segments could be predetermined (e.g., equal) lengths or could be otherwise determined/divided based on other parameters (e.g., city portions, rural portions, flat vs. hilly portions, etc.). At 616, the controller 228 obtains or otherwise defines a specific cost function that defines an SOC cost for a particular segment based on a plurality of parameters of that particular segment (speed limit, road type, road grade, road zone (i.e., LEZ or not), trailer payload, etc.). For example only, the cost of a particular segment that has a very large/long uphill portion could have a substantial cost compared to a flat highway portion with a moderate speed limit.

At 620, the controller 228 uses the cost function to compute the optimal SOC variation in each segment of the trip based on a dynamic programming technique or algorithm. For example, the optimal SOC variation for the above-mentioned flat highway portion could be relatively low such that more SOC is allocated for the above-mentioned large/long uphill portion. At 624, the controller 228 controls the electrified powertrain 204 throughout the trip based on the navigation-based SOC allocation and the method 600 then ends or returns to 604 for one or more additional cycles.

Figure 7A:
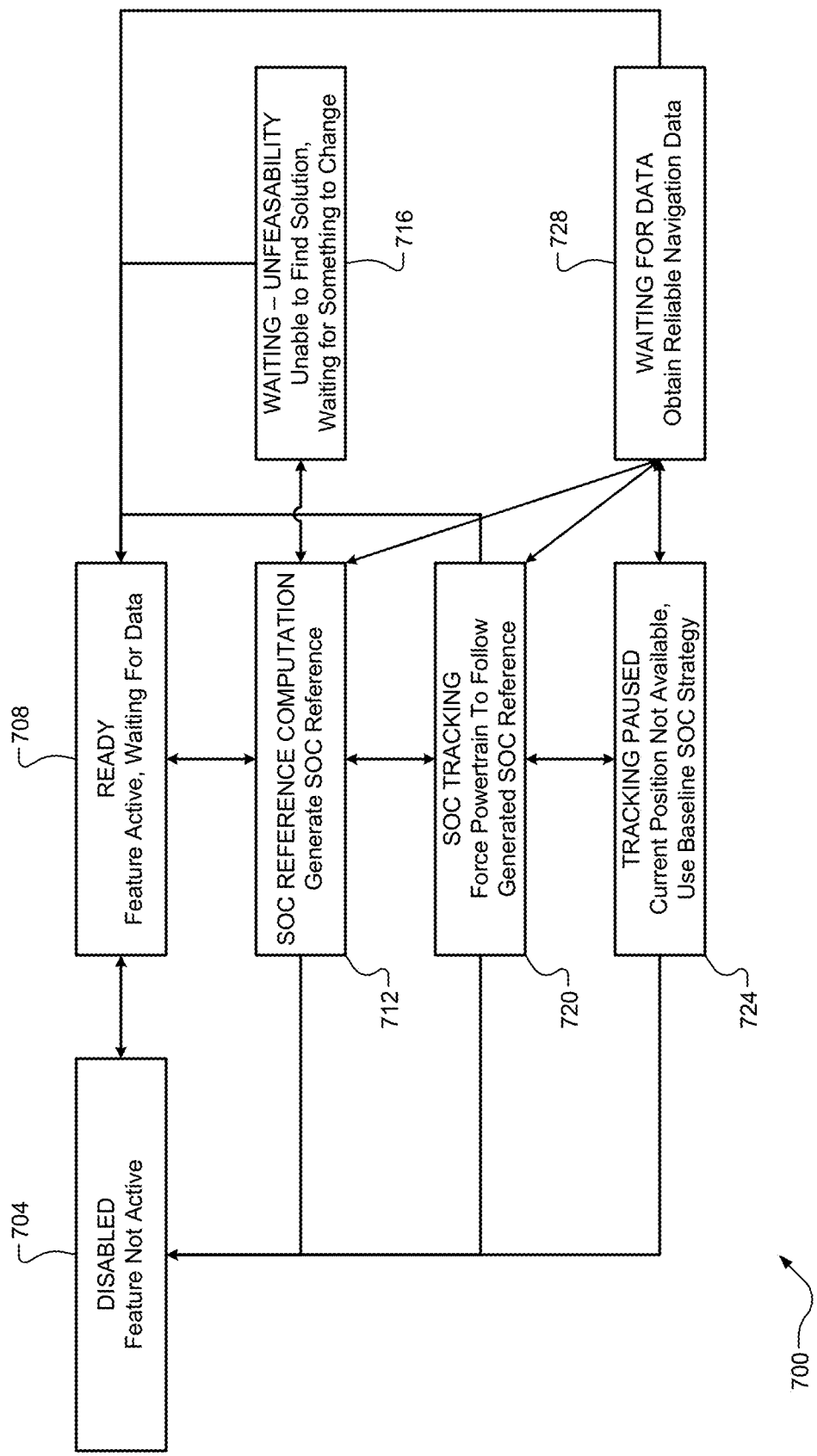
FIG. 7A is a flow diagram illustrating the possible states of the intelligent battery charge allocation method according to the principles of the present application.

Referring now to FIGS. 7A, an example SOC computation diagram 700 is illustrated. This is the logic that decides, based on the information available from navigation and vehicle status, when a new SOC allocation is to be generated after the first one created at the beginning of the trip. At 704, the feature is disabled or otherwise not active. At 708, the feature is enabled/active and waiting for data. At 712, SOC reference computation is performed to generate an SOC reference. This algorithm is run the very first time a new trip is available from the navigation system and then can only be requested thereafter. When not requested or the data is not available at 728, the process waits at 708. A new SOC reference generation could be requested in a variety of different scenarios. A first scenario is SOC error. This forces a generation of a new SOC reference due to all possible errors that might impact the SOC. This represents the local adjustment in the high-level strategy. The idea is to re-run the algorithm with the updated SOC and, possibly, the updated longitudinal model (from an estimator). In a very loose sense, this is a similar logic of a standard model predictive control (MPC) formulation (run over a defined horizon, then re-run every set sampling time). In the event the algorithm is not able to find a solution and is waiting at 716, a new request will be sent every time the SOC differs from the one expected from the previous computations and will provide a new enable to re-run the algorithm. For example, a solution may not be able to be found when a maximum number of iterations or speed becomes negative), so updated conditions are waited for rather than unnecessarily re-running (i.e., until something has changed).

A second scenario is change of path. Clearly, a new SOC generation is required every time the navigation system updates the information due to a new path. A third scenario is new longitudinal model parameters. Similar to a new path, if the vehicle parameters have changed, the algorithm is re-run with the updated information. A fourth scenario is new trip length. If the data from the navigation system is not enough to cover the entire trip, a new SOC target generation is requested every time a certain distance is covered in order to gather updated info about the remaining of the trip.

Lastly, a fifth scenario is hysteresis. This avoids re-running the algorithm unnecessarily by adding/implementing a hysteresis. For example, the hysteresis could allow the actual SOC to reach the recently-updated target SOC before a new SOC generation is thereafter re-triggered. At 720, SOC tracking is performed only when the generated SOC reference is ready and the current vehicle position is available. This includes controlling the powertrain to follow the generated SOC reference. At 724, tracking is paused, such as when the current vehicle position is lost and until it is recovered. Tracking could also be paused when a new SOC generation is requested but cannot be calculated because data is not available. Once the vehicle arrives at the destination, everything is stopped (e.g., return to ready at 708).

Figure 7B:
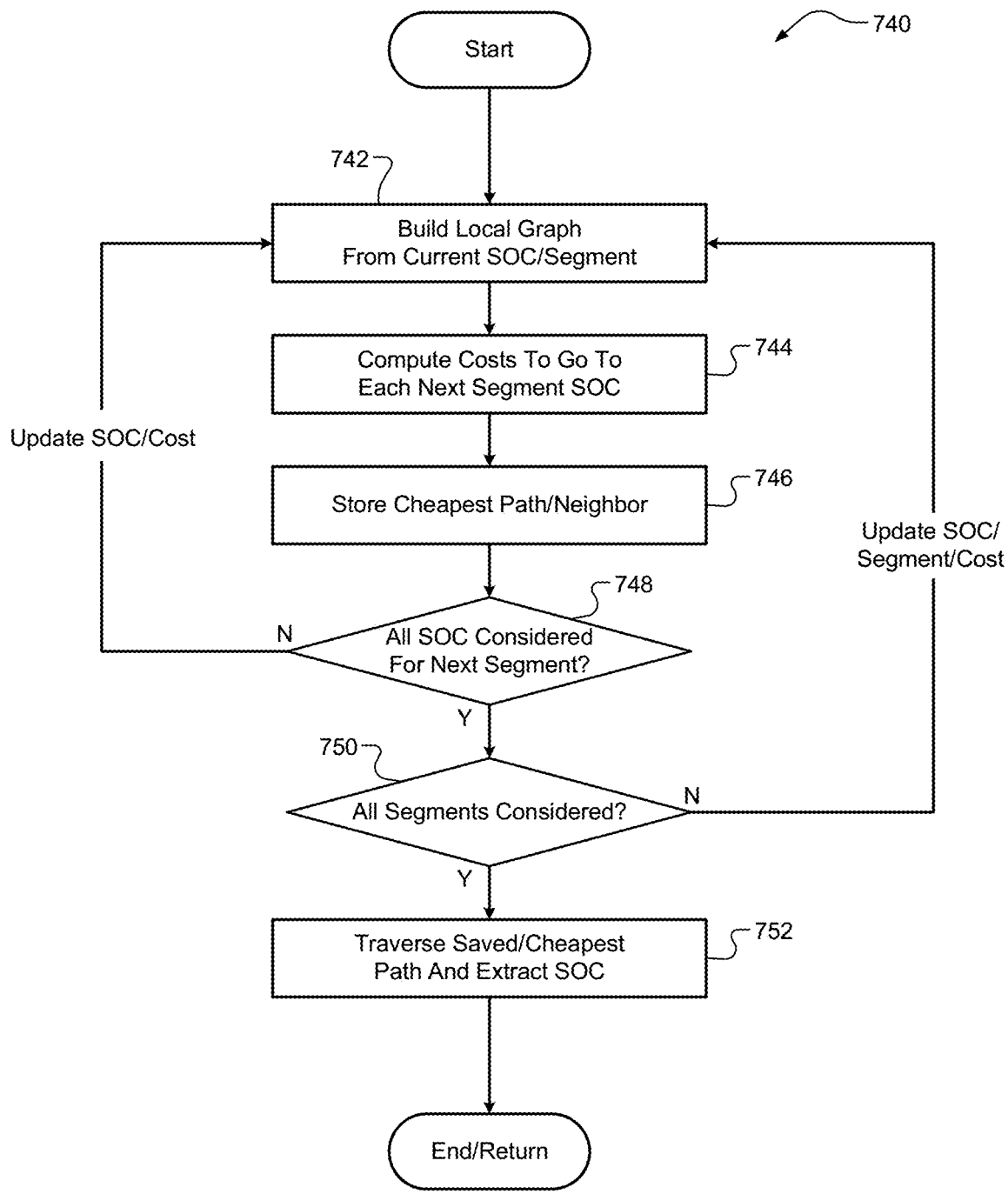
FIG. 7B is a flow diagram of the optimization algorithm used to create the SOC reference based on the navigation data available according to the principles of the present application.
Figure 7C:
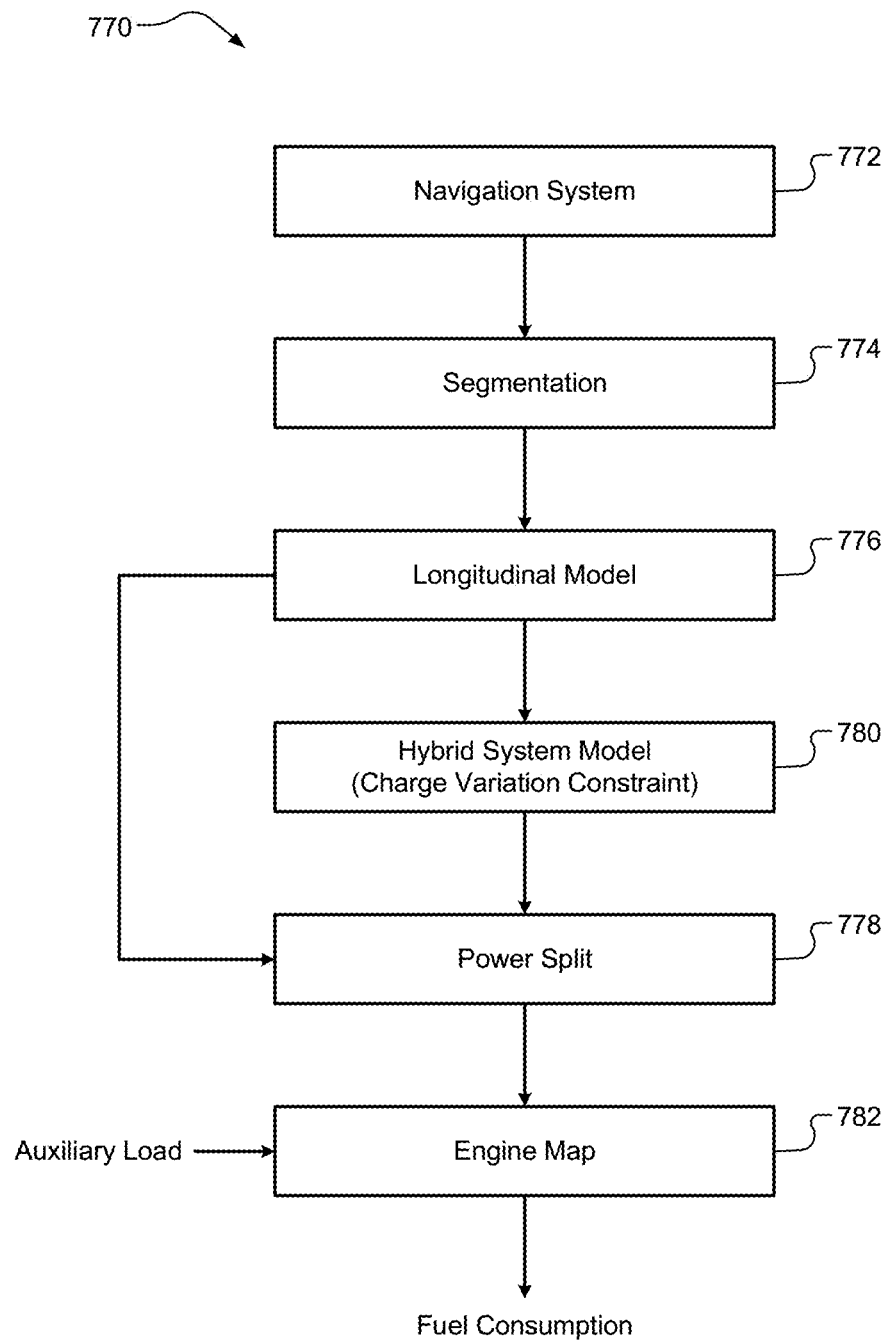
FIG. 7C is a flow diagram of the computation of the cost(s) to be used or input into the optimization algorithm according to the principles of the present application.
Figure 8A:
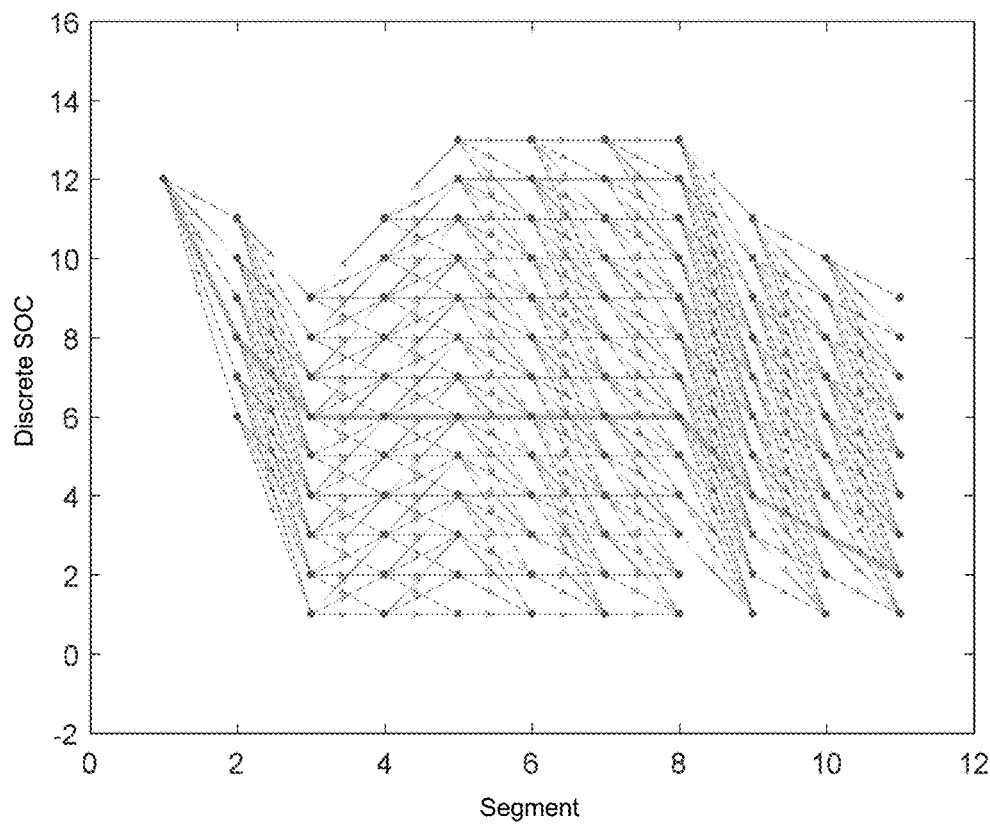
FIGS. 8A-8D are example plots of the optimization algorithm graph structure and SOC reference generates according to the principles of the present application.
Figure 8B:
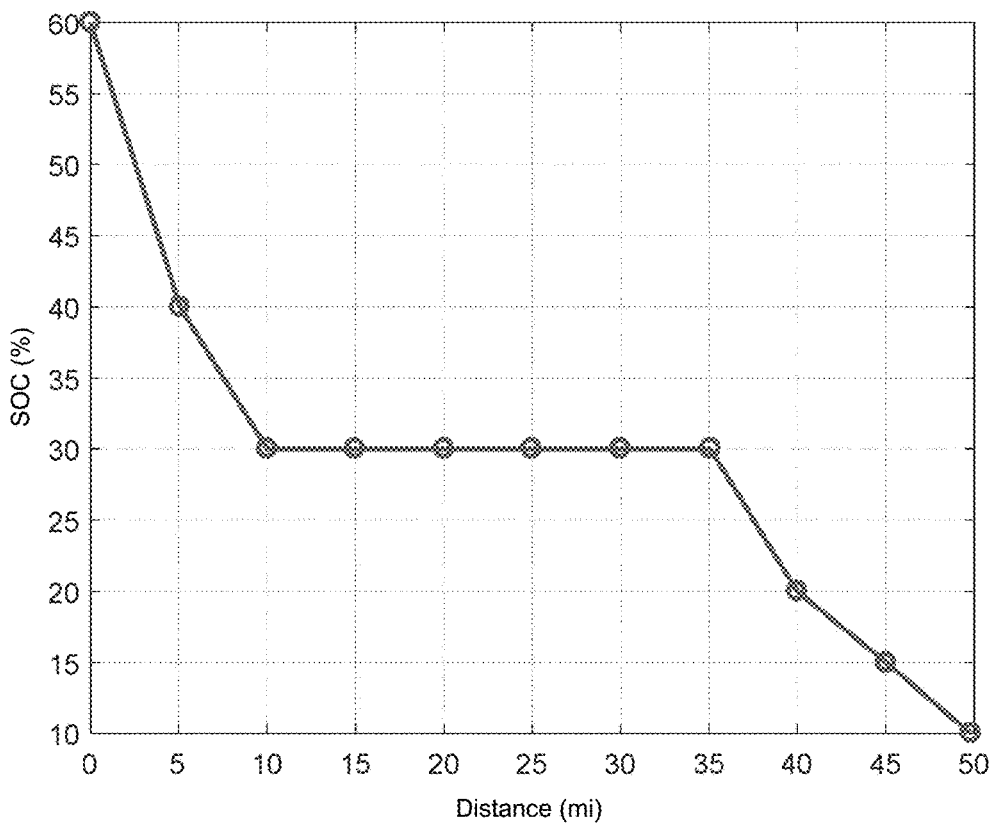
Figure 8C:
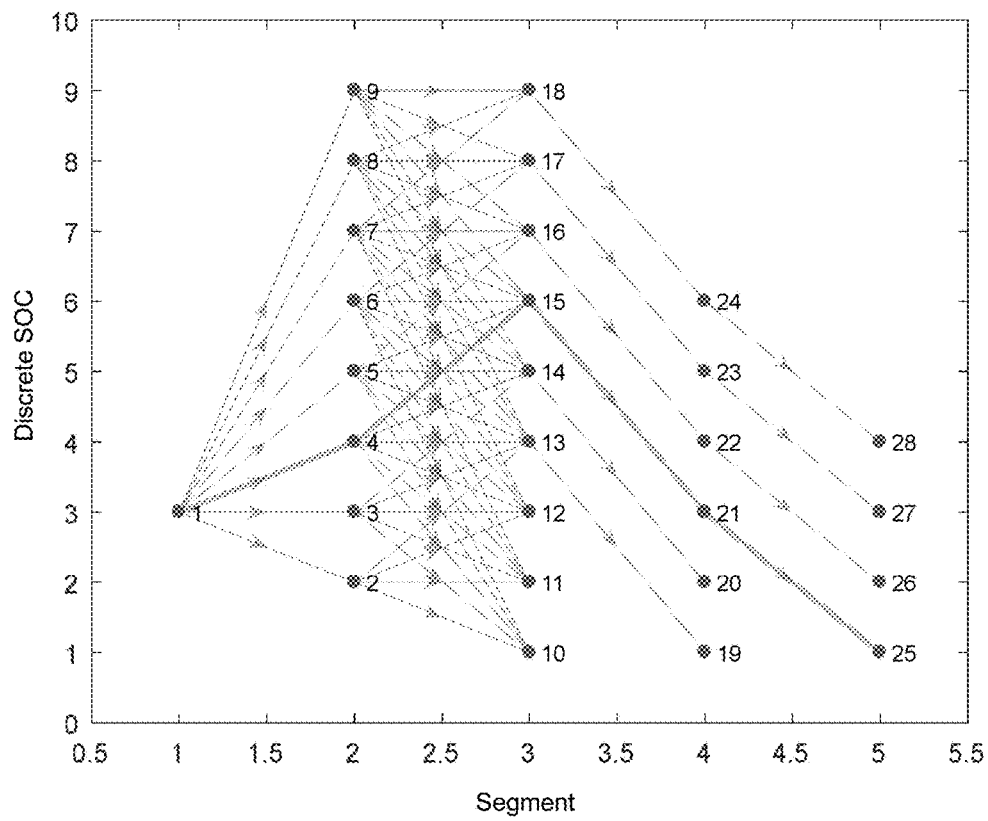
Figure 8D:
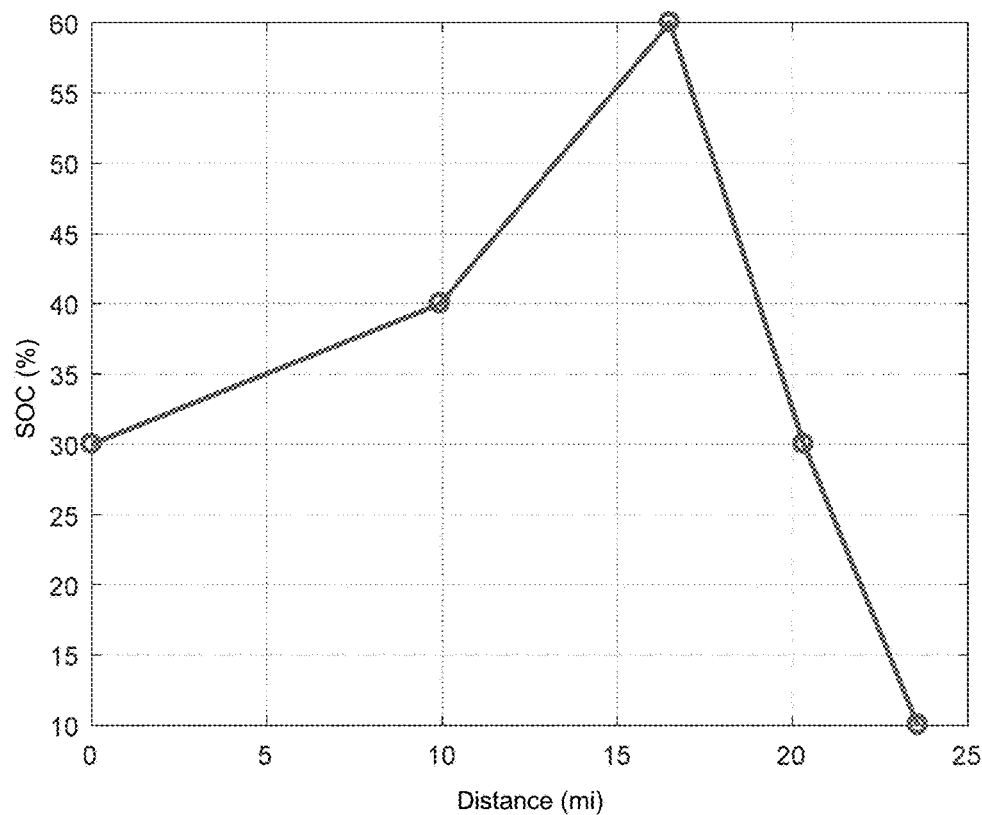

Referring now to FIGS. 7B-7C, flow diagrams 740 and 770 for SOC allocation (i.e., the algorithm used to create the SOC allocation, or the target SOC for the rest of the trip) are illustrated. This includes a main algorithm flow diagram 740 and an intermediate steps 770 flow diagram. In method 740, from a current SOC and a current segment, the local graph is built at 742. At 744, the cost to go to each next segment SOC is computed. At 746, the cheapest way/path to get to the next segment SOC and that is the cheapest neighbor is stored. At 748, it is determined whether all possible SOC have been considered for the next segment. When false, the method 740 returns to 742 including updating the SOC to the next SOC and updating the current node cost to the cost to arrive at the next node and the process repeats. When true at 748, it is determined whether all segments have been considered at 750. When false, the method 740 again returns to 742 including updating the SOC to a lower SOC of a next segment, updating the current segment to the next segment, and updating the current node cost to a cost to arrive at the next node and the process repeats. When true at 750, the saved cheapest path is traversed and the SOC is extracted at 752 and the method 740 ends.

In intermediary method 770, edge cost computation—the fuel consumed to drive the segment at the given speed limit given a specific power split—is generally shown and described more fully below. At 772, the navigation system provides parameters such as grade, raw speed limits, raw road type (LEZ zone or not), and the like are captured and provided. At 774, segmentation is performed to break the entire trip into smaller parts called segments. These are usually portions of the trip with same speed limits, similar grade and same road type, but logic is used to group these characteristics if the resulting segments are too small/short.

At 776, a longitudinal model ("a longitudinal road load model") is used to compute the equivalent energy at the wheels to drive each segment. This is fed to both 778 and 780. At 778, a power split is determined using a model of the propulsion system to compute energy required from the engine in order to drive each segment at each selected power split. At 780, a hybrid system model is used to determine minimum/maximum charge variation per segment, which is also used by the power split determination 778. The power split (energies required from the engine/powertrain) are then fed to 782 where the total energy requested from the engine for each segment is computed by taking into account expected auxiliary loads to then output a final/total energy required from the engine.

Referring now to FIGS. 8A-8D, plots of example results are illustrated. A couple of SOC targets generated for different trips are shown: a first fairly standard trip with a few slopes here and there making the "line" used in BCD not an optimal solution, and a second trip starting with low SOC and going through a BEV only area (LEZ), so the algorithm has to force charging in order to accumulate enough SOC for the BEV drive at the end. Plots in FIGS. 8A-8B correspond to the first trip, which could also be referred to as "normal driving." As shown, SOC is utilized in a specific section of the trip based on expected energy requirements and engine operating conditions. Plots in FIGS. 8C-8D correspond to the second abnormal trip, where SOC profile allocation is performed for a trip requiring battery energy. As shown, SOC is charged or increased at the beginning of the trip in order to create a buffer to be used at the end of the trip, in case of EV driving (e.g., through an LEZ zone) or any higher than engine capability power driving conditions.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An intelligent battery depletion system for a range-extended electrified vehicle (REEV), the intelligent battery depletion system comprising:
   a set of devices configured to monitor at least (i) a state of charge (SOC) of a battery system of the REEV and (ii) a distance for a trip of the REEV; and
   a controller configured to:
      control an electrified powertrain of the REEV to generate a drive torque to satisfy a driver torque request, wherein the electrified powertrain comprises an engine and an electric motor powered by the battery system;
      based on at least the battery system SOC and the trip distance, determine a blended charge depletion profile for the trip for powering the electric motor by the battery system, wherein the blended charge depletion profile includes utilizing the engine to produce at least a portion of the drive torque, and wherein the blended charge depletion profile is more gradual than a full or maximum depletion rate of the battery system to the electric motor; and
      control the electrified powertrain based on the blended charge depletion profile until the trip distance has been reached or the battery system SOC reaches a desired minimum level, and then transition to a charge sustaining mode where the engine generates the drive torque and maintains the battery system SOC at the desired minimum level.

2. The intelligent battery depletion system of claim 1, wherein the controller is further configured to:
   based on the battery system SOC, the trip distance, and navigation information, determine a navigation-based SOC allocation profile for powering the electric motor by the battery system based on the battery system SOC and the trip distance; and
   control the electrified powertrain based on the navigation-based SOC allocation profile until the trip distance has been reached.

3. The intelligent battery depletion system of claim 2, wherein the set of devices includes a navigation system configured to monitor the navigation information including at least a destination for the trip, a route of travel to the trip destination, and road characteristics along the travel route.

4. The intelligent battery depletion system of claim 3, wherein the road characteristics along the travel route include at least some of road type, road surface type, road grade, road speed limits, road EV zone type, weather conditions, and traffic conditions.

5. The intelligent battery depletion system of claim 1, wherein the controller is further configured to:
   determine a vehicle demand energy (VDE) metric as a lumped term based on rolling resistance, aerodynamic drag, road grade, and a trailer payload being towed by the REEV, wherein the VDE metric represents a ratio of the REEV energy consumption compared to a baseline energy consumption of the REEV; and
   determine a feedforward power offset based on the VDE metric, wherein the feedforward power offset is used to determine the blended charge depletion profile such that a larger power offset causes a more gradual or lesser rate of charge depletion and vice-versa.

6. The intelligent battery depletion system of claim 1, wherein:
   the set of devices further comprises a driver interface configured to receive driver input from a driver of the REEV and output information to the driver; and
   the driver input includes at least the driver torque request and a selectable mode comprising one of normal, long trip, tow, and tow plus electric.

7. The intelligent battery depletion system of claim 6, wherein:
   the driver input further includes a value for the trip distance when the long trip mode or tow mode is selected and the trip distance is otherwise determined by the navigation system; and
   the desired minimum level for the battery system SOC for defining the blended charge depletion profile is increased when the tow mode or the tow plus electric mode is selected.

8. The intelligent battery depletion system of claim 1, wherein the controller is configured to determine the blended charge depletion profile subject to noise/vibration/harshness (NVH) constraints relating to operating speeds of the engine, and wherein the NVH constraints define a maximum operating speed of the engine.

9. The intelligent battery depletion system of claim 1, wherein the blended charge depletion profile is a linear charge depletion profile over the estimated trip distance.

10. An intelligent battery depletion method for a range-extended electrified vehicle (REEV), the intelligent battery depletion method comprising:
- receiving, by a controller of the REEV and from a set of devices of the REEV, at least (i) a state of charge (SOC) of a battery system of the REEV and (ii) a distance for a trip of the REEV;
- controlling, by the controller, an electrified powertrain of the REEV to generate a drive torque to satisfy a driver torque request, wherein the electrified powertrain comprises an engine and an electric motor powered by the battery system;
- based on at least the battery system SOC and the trip distance, determining, by the controller, a blended charge depletion profile for the trip for powering the electric motor by the battery system, wherein the blended charge depletion profile includes utilizing the engine to produce at least a portion of the drive torque, and wherein the blended charge depletion profile is more gradual than a full or maximum depletion rate of the battery system to the electric motor; and
- controlling, by the controller, the electrified powertrain based on the blended charge depletion profile until the trip distance has been reached or the battery system SOC reaches a desired minimum level, and then transitioning to a charge sustaining mode where the engine generates the drive torque and maintains the battery system SOC at the desired minimum level.

11. The intelligent battery depletion method of claim 10, further comprising:
- based on the battery system SOC, the trip distance, and navigation information, determining, by the controller, a navigation-based SOC allocation profile for powering the electric motor by the battery system based on the battery system SOC and the trip distance; and
- controlling, by the controller, the electrified powertrain based on the navigation-based SOC allocation profile until the trip distance has been reached.

12. The intelligent battery depletion method of claim 11, wherein the set of devices includes a navigation system configured to monitor the navigation information including at least a destination for the trip, a route of travel to the trip destination, and road characteristics along the travel route.

13. The intelligent battery depletion method of claim 12, wherein the road characteristics along the travel route include at least some of road type, road surface type, road grade, road speed limits, road EV zone type, weather conditions, and traffic conditions.

14. The intelligent battery depletion method of claim 10, further comprising:
- determining, by the controller, a vehicle demand energy (VDE) metric as a lumped term based on rolling resistance, aerodynamic drag, road grade, and a trailer payload being towed by the REEV, wherein the VDE metric represents a ratio of the REEV energy consumption compared to a baseline energy consumption of the REEV; and
- determining, by the controller, a feedforward power offset based on the VDE metric, wherein the feedforward power offset is used to determine the blended charge depletion profile such that a larger power offset causes a more gradual or lesser rate of charge depletion and vice-versa.

15. The intelligent battery depletion method of claim 10, wherein:
- the set of devices further comprises a driver interface configured to receive driver input from a driver of the REEV and output information to the driver; and
- the driver input includes at least the driver torque request and a selectable mode comprising one of normal, long trip, tow, and a tow plus electric.

16. The intelligent battery depletion method of claim 15, wherein:
- the driver input further includes a value for the trip distance when the long trip mode or tow mode is selected and the trip distance is otherwise determined by the navigation system; and
- the desired minimum level for the battery system SOC for defining the blended charge depletion profile is increased when the tow mode or the tow plus electric mode is selected.

17. The intelligent battery depletion method of claim 10, wherein determining, by the controller, the blended charge depletion is subject to noise/vibration/harshness (NVH) constraints relating to operating speeds of the engine, and wherein the NVH constraints define a maximum operating speed of the engine.

18. The intelligent battery depletion method of claim 10, wherein the blended charge depletion profile is a linear charge depletion profile over the estimated trip distance.

* * * * *